No. 824,785. PATENTED JULY 3, 1906.
A. H. HALL.
SAW GAGE.
APPLICATION FILED DEC. 30, 1903.
2 SHEETS—SHEET 2.
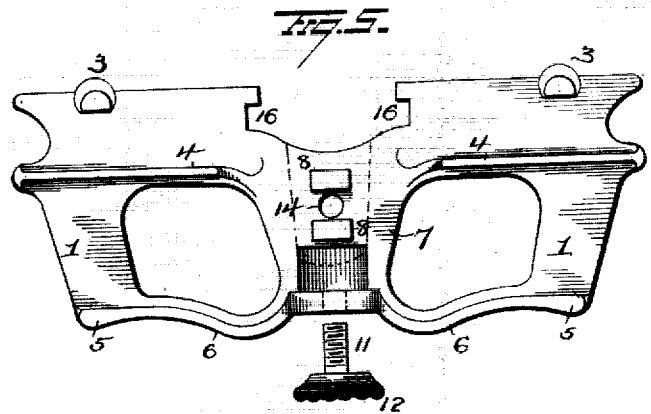
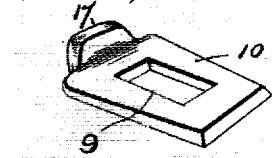
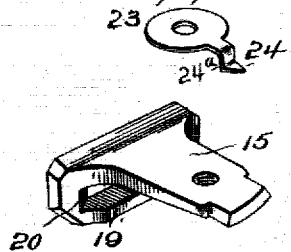
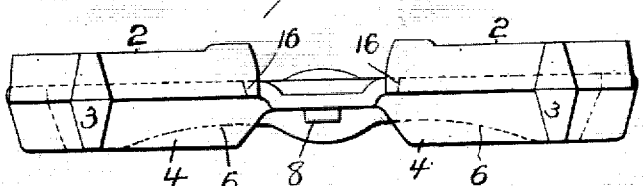
WITNESSES
INVENTOR
A. H. Hall
Attorney

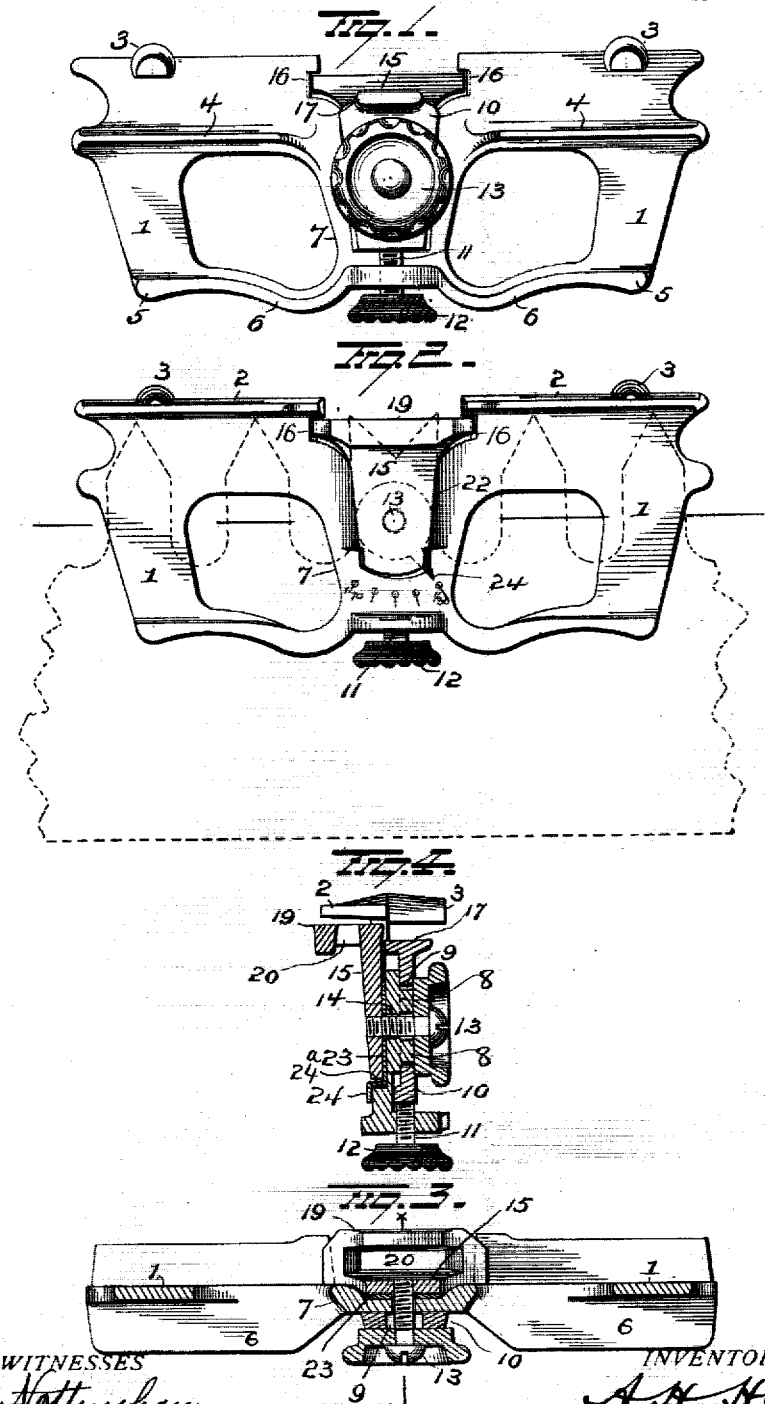

UNITED STATES PATENT OFFICE.

ALBERT H. HALL, OF ADRIAN, MICHIGAN.

SAW-GAGE.

No. 824,785.  Specification of Letters Patent.  Patented July 3, 1906.

Application filed December 30, 1903. Serial No. 187,217.

*To all whom it may concern:*

Be it known that I, ALBERT H. HALL, a resident of Adrian, in the county of Lenawee and State of Michigan, have invented certain new and useful Improvements in Saw-Gages; and I do hereby declare the following to be a full, clear, and exact description of the invention, such as will enable others skilled in the art to which it appertains to make and use the same.

My invention relates to an improved saw-gage, an object of the invention being to provide an improved saw-gage that will be compact, light, strong, and simple in construction and one in which all movable parts will be maintained in their true parallelism and angular positions.

A further object is to provide an improved gage operated entirely by hand and so shape the framework as to dispense with all unnecessary metal, but give to the same the necessary strength and durability to withstand all the necessary work to which it is subjected.

A still further object of my invention is to provide the raker gage-plate with a positive adjustable stop; and a still further and prime object of my invention is the provision of means whereby the operator can quickly and accurately get the necessary adjustments to raker gage-plate to a minimum and can return to the same.

With these objects in view the invention consists in certain novel features of construction and combinations and arrangements of parts, as will be more fully hereinafter described, and pointed out in the claims.

In the accompanying drawings, Figures 1 and 2 are views in elevation of opposite sides of my improvements. Fig. 3 is a view in section through the center of the gage. Fig. 4 is a view in section on the line *x x* of Fig. 3, and Figs. 5, 6, 7, 8, and 9 are views illustrating various details of construction.

1 represents the main body or cast-metal frame made straight on one long edge, given a compound curvature at its opposite long edge, and having the irregular contour shown at its ends. Along the straight edge at one side is a flange 2, having a severed or disconnected center, leaving an open space therein, and posts 3 project from this straight edge near its ends and in a direction opposite to the flange 2 and are so cast as to overlap the flange 2, made integral therewith, and add considerable strength thereto.

On the same side as posts 3, spaced therefrom and parallel with the straight edge, are flanges 4 on opposite sides of the central portion of the frame, and these flanges, together with the enlarged ends 5 of flanges 6 at the curved edge of the frame, afford a perfect bearing against the saw, and between the flanges 4 and 6 the metal of the frame is cut out at opposite sides of the center for lightness and to afford a ready grasp of the flange 6 in placing the tool in position on the saw and operating the same.

The central solid and rigid portion 7 of the frame is made with angular lugs 8 on the same side as flanges 4 and 6, and these lugs enter an angular slot 9 in an adjustable clamping-bar 10 to hold the bar true, yet permit of its ready adjustment by a screw 11, passed through a threaded opening in the center of flange 6 and free end of said screw bearing against the end of bar 10. This screw 11 comprises an ordinary factory-screw secured in an enlarged countersunk head 12, having roughened periphery to facilitate its operation, and a screw 13, similar in construction to screw 11, although larger, is passed through an opening 14 in the central portion 7 of the frame between lugs 8 and screwed into a threaded opening in the raker gage-plate 15 and serves by reason of its enlarged head to hold the bar 10 on the lugs 8 and in proper operative position and in addition clamps the raker gage-plate 15 in any position to which it may be adjusted, as will be hereinafter explained.

The central portion 7 at the straight edge of frame 1 has a cut-out portion 16, having its side walls vertically parallel yet horizontally on a bevel. The outer or contracted end of bar 10 is shaped to fit cut-out portion 16 and is enlarged on both sides, forming a bearing-face 17, extending from a plane in the cut-out portion 16 the desired distance outward to give to the bar a large bearing-face to clamp a file between the same and posts 3, and by exerting sufficient pressure of screw 11 on bar 10 the file can be curved to conform to the curvature of a saw.

The raker gage-plate 15, above referred to, is made with a head 19, having beveled end walls fitting the beveled side walls of the enlarged section of cut-out portion 16, and a slot 20 for the reception of the raker-teeth. The gage-plate 15 has beveled or inclined side walls which fit a similarly-shaped recess or depression 22 in the central portion 7 on the side opposite to bar 10. The lower end of plate 15 is curved in an arc of a circle concentric with its opening for screw 13, and the end wall of recess or depression 22 is curved in the arc of a circle eccentric thereto for a purpose which will now be explained.

Between the frame 1 and gage-plate 15 a thin metal plate 23 is located and made with a circular opening, whereby said plate is pivotally supported on the screw 13. The plate 23 is provided with a pointer 24, bent outwardly from the plate to form a shoulder 24ª, to be disposed between the lower curved end of the gage-plate and the curved bottom face of the recess 22. Beyond the shoulder 24ª the pointer is bent at right angles over the frame 1 to register with a scale thereon. When the pointer is at the extreme right, the gage-plate will be in its extreme position spaced the greatest distance from flange 2, and as the pointer is moved to the left the shoulder 24ª, moving between the adjacent eccentric faces formed by the bottom of recess 22 and the lower end of the gage-plate, will cause the latter to move longitudinally by the wedging of said shoulder between said eccentric faces in uniform proportion, as indicated by the scale, and when the proper adjustment has been secured the screw 13 will be operated to firmly clamp the gage-plate in such position.

Having fully described my invention, what I claim as new, and desire to secure by Letters Patent, is—

1. In a saw-gage, the combination with a frame, of a raker gage-plate, a scale on the frame, and a pointer registering with said scale means coöperating with the pointer and gage-plate to adjust the latter, when the pointer is moved, substantially as set forth.

2. In a saw-gage, the combination with a frame, of a raker gage-plate, a scale on said frame, a pointer registering with said scale, means coöperating with the pointer and gage-plate to adjust the latter when the pointer is moved, and means for securing said gage-plate at any adjustment, substantially as set forth.

3. In a saw-gage, the combination with a frame, of a raker gage-plate, a scale on said frame, a pointer registering with said scale, means coöperating with the pointer and gage-plate to adjust the latter when the pointer is moved, and a set-screw adapted to clamp the gage-plate at any adjustment, substantially as set forth.

4. In a saw-gage, the combination with a frame provided with a curved face and a longitudinally-movable gage-plate having a curved end face eccentric to the curved face on the frame, and a pointer having a part movable between said eccentric faces to move the gage-plate longitudinally.

5. In a gage-plate, the combination with a frame having a recess or depression therein, of a raker gage-plate mounted in said recess or depression, a clamping set-screw passed through the frame and into the gage-plate, a pointer having a hole through which said screw freely passes, said pointer projecting between the end of the gage-plate and recess, the lower end of the gage-plate and recess curved in arcs of different circles, whereby a movement of the pointer between them will adjust the gage-plate.

6. In a saw-gage, the combination with a frame, of a gage-plate at one side of the frame, means for guiding said plate, lugs projecting from the other side of the frame, a file-clamping bar having an elongated slot to receive said lugs, abutments on the frame over the file-clamping bar, a screw passing freely through said elongated slot and frame and entering a threaded hole in the gage-plate, said screw having a head bearing against said lugs, and a screw passing upwardly through a hole in the bottom of the frame and engaging the lower end of the file-clamping bar.

7. A saw-gage, comprising a metal frame having a straight edge, a flange on one side thereof, a raker gage-plate on the same side and posts projecting outward from the opposite side of the straight edge, of a clamping-bar having an angular slot therein, angular lugs on the frame to enter the slot and hold the bar in correct angular position, a set-screw to adjust the bar longitudinally, and a set-screw having a head disposed parallel with the bar to hold the latter on the lugs, said set-screw entering the gage-plate and holding it in any position to which it may be moved.

In testimony whereof I have signed this specification in the presence of two subscribing witnesses.

ALBERT H. HALL.

Witnesses:
  WALTER S. WESTERMAN,
  DAVID A. HICKS.